US010257769B2

(12) United States Patent
Doyle et al.

(10) Patent No.: US 10,257,769 B2
(45) Date of Patent: Apr. 9, 2019

(54) ACCESS POINT GROUP TRANSMISSIONS

(71) Applicant: Aruba Networks, Inc., Sunnyvale, CA (US)

(72) Inventors: Aidan Doyle, Santa Clara, CA (US); Gaurav Patwardhan, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/445,903

(22) Filed: Feb. 28, 2017

(65) Prior Publication Data

US 2018/0249396 A1 Aug. 30, 2018

(51) Int. Cl.
| | | |
|---|---|---|
| H04W 40/22 | (2009.01) | |
| H04W 40/32 | (2009.01) | |
| H04W 84/18 | (2009.01) | |
| H04B 7/0452 | (2017.01) | |
| H04L 12/701 | (2013.01) | |
| H04L 12/933 | (2013.01) | |

(52) U.S. Cl.
CPC .......... *H04W 40/32* (2013.01); *H04B 7/0452* (2013.01); *H04L 45/00* (2013.01); *H04L 49/15* (2013.01); *H04W 40/22* (2013.01); *H04W 84/18* (2013.01)

(58) Field of Classification Search
CPC .............................. H04W 40/32; H04L 49/15
See application file for complete search history.

(56) References Cited

U.S. PATENT DOCUMENTS

| | | | |
|---|---|---|---|
| 8,451,752 B2 | 5/2013 | Lu | |
| 8,532,071 B2 | 9/2013 | Seok | |
| 9,113,313 B2 | 8/2015 | Cheong et al. | |
| 2001/0034793 A1* | 10/2001 | Madruga | H04L 12/1854 709/238 |
| 2006/0182076 A1 | 8/2006 | Wang | |
| 2007/0248104 A1* | 10/2007 | Rudolf | H04L 12/12 370/400 |
| 2008/0080364 A1* | 4/2008 | Barak | H04B 7/0408 370/210 |

(Continued)

FOREIGN PATENT DOCUMENTS

| | | |
|---|---|---|
| EP | 1744493 A1 | 1/2007 |
| EP | 2337273 A1 | 6/2011 |
| WO | 2016/115545 A2 | 7/2016 |

OTHER PUBLICATIONS

Hsu, Y-C. et al.; "Client-AP Association for Multiuser MIMO Networks"; Jun. 8-12, 2015; 6 pages.

(Continued)

*Primary Examiner* — Kashif Siddiqui
(74) *Attorney, Agent, or Firm* — Brooks, Cameron & Huebsch, PLLC

(57) ABSTRACT

Example implementations relate to access point group transmissions. For example, an access point can include instructions to determine a first mesh point to be a first hop for a first data packet and determine a second mesh point to be a second hop for a second data packet. In some examples, the access point can include instructions to group the first mesh point and the second mesh point, and utilize the group to simultaneously transmit the first data packet to the first mesh point and the second data packet to the second mesh point.

14 Claims, 5 Drawing Sheets

(56) References Cited

U.S. PATENT DOCUMENTS

| | | | |
|---|---|---|---|
| 2008/0192692 A1* | 8/2008 | Chari | H04L 47/10 370/331 |
| 2009/0000329 A1 | 1/2009 | Colberg et al. | |
| 2009/0003291 A1 | 1/2009 | Chu et al. | |
| 2009/0279514 A1 | 11/2009 | Seok | |
| 2009/0303921 A1* | 12/2009 | Manchanda | H04W 84/18 370/328 |
| 2010/0046471 A1* | 2/2010 | Hattori | H04B 7/022 370/331 |
| 2010/0067362 A1* | 3/2010 | Sakaguchi | H04L 25/0206 370/203 |
| 2010/0182929 A1 | 7/2010 | Abraham et al. | |
| 2011/0069687 A1 | 3/2011 | Rezvani et al. | |
| 2013/0188627 A1 | 7/2013 | Cheong et al. | |
| 2014/0196025 A1* | 7/2014 | Corinella | H04W 76/10 717/178 |
| 2014/0204846 A1 | 7/2014 | Maltsev et al. | |
| 2015/0304011 A1 | 10/2015 | Ponnuswamy | |
| 2017/0134981 A1* | 5/2017 | Duschl | H04W 28/0221 |

OTHER PUBLICATIONS

Kim, Y. et al.; "Efficient Interference-aware Channel Allocation in Multi-radio Wireless Mesh Networks"; Feb. 19-22, 2012; 6 pages.

Shen Gang et al: "Multi-hop relay for next-generation wireless access networks", Bell Labs Technical Journal, Wiley, CA, us, vol. 13, No. 4, Jan. 1, 2009 (Jan. 1, 2009), pp. 175-193.

International Search Report and Written Opinion received for PCT Patent Application No. PCT/US2018/020153, dated Jun. 12, 2018, 9 pages.

European Search Report and Search Opinion Received for EP Application No. 17198010.5, dated May 8, 2018, 11 pages.

* cited by examiner

ACCESS POINT GROUP TRANSMISSIONS

BACKGROUND

Networks can include a plurality of access points. Some networks can utilize a plurality of mesh points and/or plurality of mesh access points. Networks that utilize a plurality of mesh points can be considered mesh networks. Mesh networks can utilize a mesh portal that is connected to a backend distribution system. In some examples, the mesh portal can be connected to the backend distribution system via a wired connection. In some examples, the mesh portal can be wirelessly connected to a plurality of mesh points. Mesh points can be mesh access points for a mesh network. The mesh points can be connected to a plurality of stations and/or client devices.

DETAILED DESCRIPTION

Figure 1:
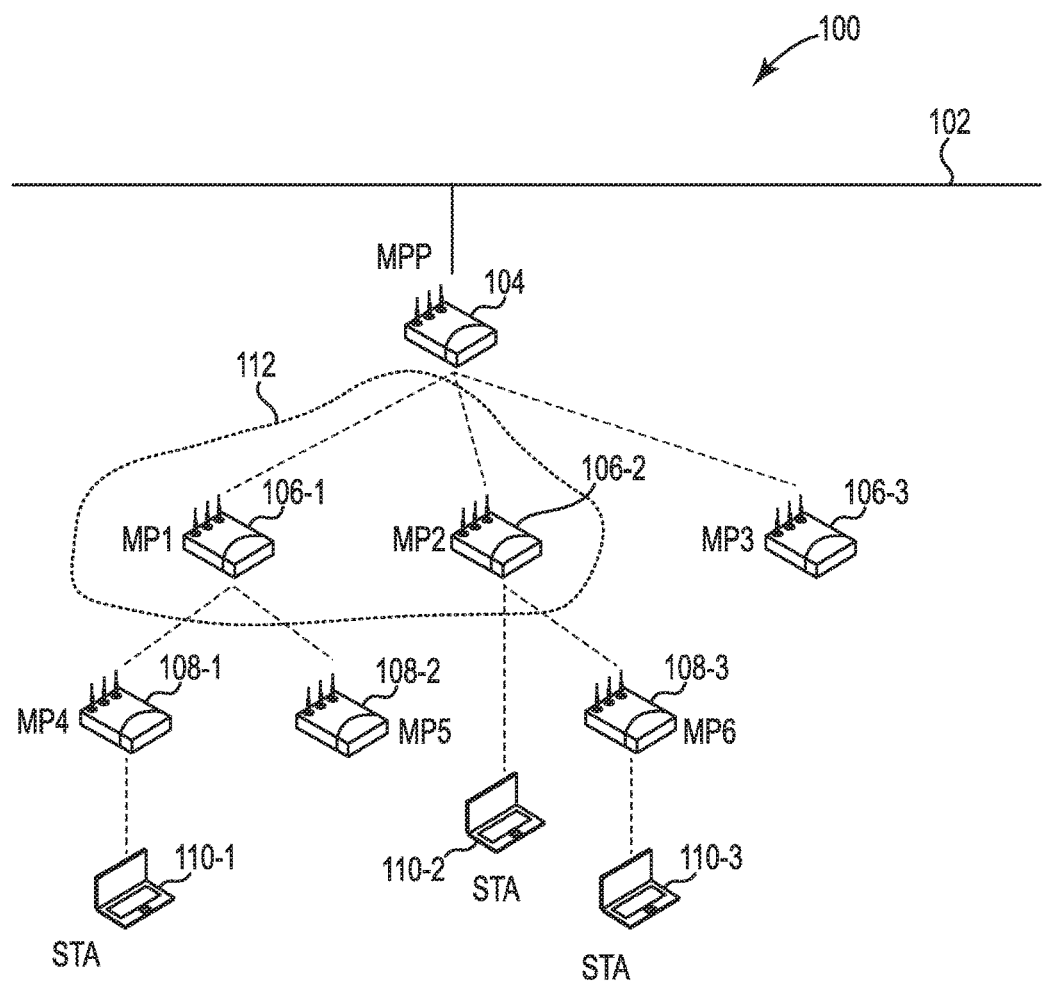
FIG. 1 illustrates an example network for access point group transmissions, consistent with the present disclosure.

Access point group transmissions as described herein can be utilized for a number of different networks. For example, the access point group transmissions can be utilized for mesh networks that include a plurality of access points or mesh points that can be in communication with other access points or mesh points within the network. In some examples, the access points or mesh points can utilize wireless communication to transfer and receive data packets from other access points or mesh points within the network. An AP can refer to a networking device that allows a client device to connect to a wired or wireless network.

As used herein, the term "access point" (AP) can, for example, refer to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards. An AP can include a processing resource, memory, and/or input/output interfaces, including wired network interfaces such as IEEE 802.3 Ethernet interfaces, as well as wireless network interfaces such as IEEE 802.11 Wi-Fi interfaces, although examples of the disclosure are not limited to such interfaces. An AP can include a memory resource or machine readable storage medium, including read-write memory, and a hierarchy of persistent memory such as ROM, EPROM, and Flash memory. As used herein, a mesh point can, for example, be an access point utilized in a mesh network.

The network can include an access point that acts as a mesh portal for a mesh network. As used herein, a mesh portal can, for example, be a mesh point that is connected to a backend distribution system. In some examples, the mesh portal can be connected via a wired connection to the backend distribution system. In some examples, the mesh portal can be utilized as a gateway for a plurality of access points or mesh points to access the backend distribution system. For example, the plurality of access points or mesh points within the network can utilize the mesh portal to access the backend distribution system.

Access point group transmissions can include an access point that determines a group of access points or mesh points to send a data packet. In some examples, the group of access points can include a portion of the plurality of access points or mesh points within the network. In some examples, the group of access points can include access points positioned in an uplink path of the access point and/or positioned in a downlink path of the access point. For example, the group of access points or mesh points can be in an uplink path when the group of access points or mesh points are a hop between the access point and the mesh portal. In another example, the group of access points or mesh points can be in a downlink path when the group of access points or mesh points are a hop between the access point and a client device. As used herein, the term "client device" can, for example, refer to a device including a processing resource, memory, and input/output interfaces for wired and/or wireless communication. For example, a client device may include a laptop computer, a desktop computer, a mobile device, and/or other wireless devices, although examples of the disclosure are not limited to such devices. A mobile device may, for example, refer to devices that are (or may be) carried and/or worn by a user. For instance, a mobile device can be a phone (e.g., a smart phone), a tablet, a personal digital assistant (PDA), smart glasses, and/or a wrist-worn device (e.g., a smart watch), among other types of mobile devices.

In some examples, the access point can utilize the group as a multi-user multiple-input multiple-output (MU-MIMO) group to send data packets to the group of access point or mesh points. In some examples, the MU-MIMO group can include a plurality of access points or mesh points to simultaneously broadcast data packets to the MU-MIMO group. In some examples, the MU-MIMO group can be utilized to send different data packets simultaneously to each of the plurality of access points or mesh points. For example, an access point can determine a first access point as a hop for a first data packet and determine a second access point as a hop for a second data packet. In this example, the first access point and the second access point can be grouped together as a MU-MIMO group. In this example, the access point can simultaneously transmit the first data packet to the first access point and the second data packet to the second access point. That is, the access point can simultaneously transmit multiple data packets to access points of the MU-MIMO group.

FIG. 1 illustrates an example network 100 for access point group transmissions, consistent with the present disclosure. In some examples, the network 100 can be a mesh network. As used herein, a mesh network can, for example, be a network topology where each access point relays data for the network 100. Mesh networks can relay messages using a flooding technique or a routing technique. The routing technique can transfer data packets along a path by hopping from one access point to another access point until the data packet reaches a destination. In some examples, the plurality of access points of the network 100 can include continuous connections.

The network 100 can include a network distribution system 102. The network distribution system 102 can interconnect a basic service set (BSS). In some examples, the network distribution system 102 can be utilized to connect network devices within the network 100 to other networks (e.g., Internet, wide area networks, etc.). As used herein, 'network device' generally includes a device that can be adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

In some examples, the network distribution system 102 can be connected to a mesh portal 104. As described herein, a mesh portal 104 can be a gateway for other network devices to access the network distribution system 102. In some examples, the mesh portal 104 can be connected to the network distribution system 102 via a wired connection (e.g., Ethernet connection, etc.). The mesh portal 104 can be connected to a plurality of mesh points 106-1, 106-2, 106-3. In some examples, the plurality of mesh points 106-1, 106-2, 106-3 can be access points as described herein. The plurality of mesh points 106-1, 106-2, 106-3 can be in a downlink path from the mesh portal 104. In some examples, the mesh portal 104 can be wirelessly connected to the plurality of mesh points 106-1, 106-2, 106-3.

The plurality of mesh points 106-1, 106-2, 106-3 can each be connected to a plurality of mesh points, stations, and/or client devices. For example, mesh point 106-1 can be connected to mesh point 108-1 and mesh point 108-2 via a wireless connection. In some examples, the mesh point 108-1 and mesh point 108-2 can be in a downlink path of mesh point 106-1. In another example, mesh point 106-2 can be connected to mesh point 108-3 and station 110-2. In some examples, the mesh point 106-2 can be connected to mesh point 108-3 via a first wireless connection (e.g., wireless backhaul, etc.) and the mesh point 106-2 can be connected to station 110-2 via a second wireless connection (e.g., 802.11 access, etc.). In some examples, the station 110-2 can be a client device (e.g., computing device, laptop, tablet, smartphone, etc.). In some examples, the mesh point 108-3 can be connected to station 110-3 and mesh point 108-1 can be connected to station 110-1 via wireless connection as described herein.

In some examples, the mesh portal 104 can have a plurality of data packets to distribute to a portion of the plurality of stations 110-1, 110-2, 110-3. For example, the mesh portal can have a first data packet to be distributed to station 110-1 and a second data packet to be distributed to station 110-2. In this example, the mesh portal 104 can determine a first hop mesh point for the first data packet and a second hop mesh point for the second data packet. As used herein, a hop mesh point can, for example, be a mesh point that is connected directly to the destination device (e.g., station, client device, device with destination address, etc.) or connected to a mesh point that is connected to a sending device and connected indirectly to the destination device (e.g., connected to an additional mesh point that is connected to the destination device, etc.).

The mesh portal 104 can determine that the mesh point 106-1 is a hop mesh point for a first data packet and that the mesh point 106-2 is a hop mesh point for a second data packet. For example, the mesh portal can determine that the destination of the first data packet is station 110-1 and the destination of the second data packet is station 110-2. In this example, the portal can determine that the mesh point 106-1 is a hop mesh point for the first data packet and that the mesh point 106-2 is a hop mesh point for the second data packet based on the destination of the first data packet and the second data packet.

In some examples, the mesh portal 104 can establish a group 112 of mesh points that includes the mesh point 106-1 and the mesh point 106-2. In some examples, the group 112 can be a MU-MIMO group. For example, the group 112 can be a MU-MIMO group that allows the mesh portal 104 to simultaneously transmit the first data packet to the mesh point 106-1 and the second data packet to the mesh point 106-2. In some examples, the first data packet can include different information than the second data packet. For example, the first data packet can be unrelated to the second data packet. That is, simultaneously transmitting the first data packet and the second data packet is different than transmitting a broadcast packet. As used herein, the term "information" can, for example, refer to data, addresses, control, management (e.g., statistics) or any combination thereof. For transmission, information may be transmitted as a message, which may, for example, be in the form of a collection of bits in a predetermined format. One type of message, namely a wireless message, includes a header and payload data having a predetermined number of bits of information. The wireless message may be placed in a format as a plurality of packets, frames, or cells.

In some examples, the network 100 can utilize the MU-MIMO group to transmit the first data packet and the second data packet simultaneously to lower a quantity of time for transmitting the first data packet and second data packet. For example, it can take less time to transmit the first data packet and second data packet to the mesh points of the MU-MIMO group than transmitting the first data packet and the second data packet separately.

Figure 2:
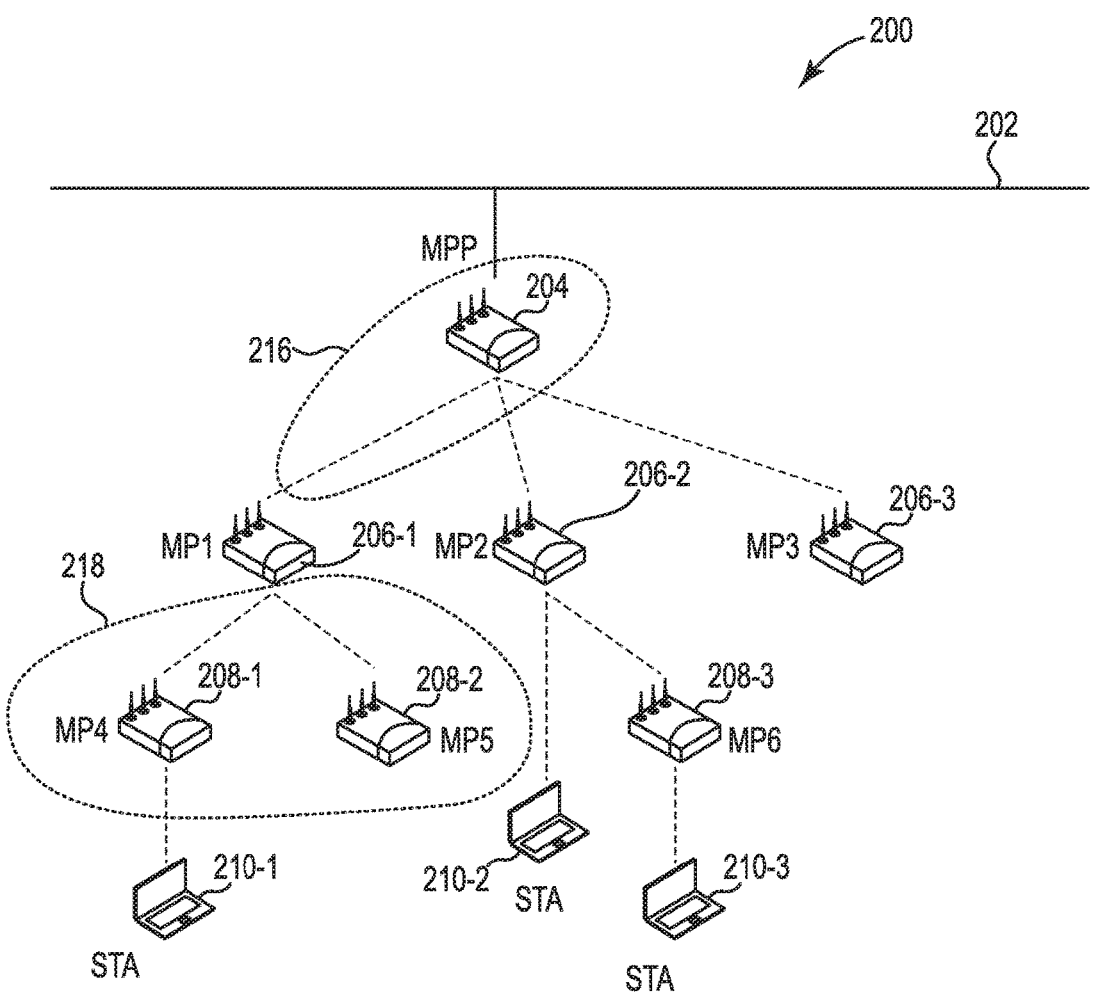
FIG. 2 illustrates an example network for access point group transmissions, consistent with the present disclosure.

FIG. 2 illustrates an example network 200 for access point group transmissions, consistent with the present disclosure. In some examples, the network 200 can be a mesh network. As used herein, a mesh network can, for example, be a network topology where each access point relays data for the network 200. Mesh networks can relay messages using a flooding technique or a routing technique as described herein.

The network 200 can include a network distribution system 202. The network distribution system 202 can interconnect a basic service set (BSS). In some examples, the network distribution system 202 can be utilized to connect network devices within the network 200 to other networks (e.g., Internet, wide area networks, etc.).

In some examples, the network distribution system 202 can be connected to a mesh portal 204. As described herein, a mesh portal 204 can be a gateway for other network devices to access the network distribution system 202. In some examples, the mesh portal 204 can be connected to the network distribution system 202 via a wired connection (e.g., Ethernet connection, etc.). The mesh portal 204 can be connected to a plurality of mesh points 206-1, 206-2, 206-3. In some examples, the plurality of mesh points 206-1, 206-2, 206-3 can be access points as described herein. The plurality of mesh points 206-1, 206-2, 206-3 can be in a downlink path from the mesh portal 204. In some examples, the mesh portal 204 can be wirelessly connected to the plurality of mesh points 206-1, 206-2, 206-3.

The plurality of mesh points 206-1, 206-2, 206-3 can each be connected to a plurality of mesh points, stations, and/or client devices. For example, mesh point 206-1 can be connected to mesh point 208-1 and mesh point 208-2 via a wireless connection. In some examples, the mesh point 208-1 and mesh point 208-2 can be in a downlink path of mesh point 206-1. In another example, mesh point 206-2 can be connected to mesh point 208-3 and station 210-2. In some examples, the mesh point 206-2 can be connected to mesh point 208-3 via a first wireless connection (e.g., wireless backhaul, etc.) and the mesh point 206-2 can be connected to station 210-2 via a second wireless connection (e.g., 802.11 access, etc.). In some examples, the station 210-2 can be a client device (e.g., computing device, laptop, tablet, smartphone, etc.). In some examples, the mesh point 208-3 can be connected to station 210-3 and mesh point 208-1 can be connected to station 210-1 via wireless connection as described herein.

In some examples, the mesh point 206-1 can have a plurality of data packets to distribute to the distribution system 202, the mesh portal 204, the mesh portal 208-2, and/or the station 210-1. For example, the mesh point 206-1 can have a first data packet to be distributed to station 210-1 and a second data packet to be distributed to the distribution system 202. In this example, the mesh point 206-1 can determine a hop mesh point for the first data packet and the second data packet. As used herein, a hop mesh point can, for example, be a mesh point that is connected directly to the destination device (e.g., station, client device, device with destination address, etc.) or connected to a mesh point that is connected to a sending device and connected indirectly to the destination device (e.g., connected to an additional mesh point that is connected to the destination device, etc.).

The mesh point 206-1 can determine that the mesh point 208-1 is a hop mesh point for a first data packet, the mesh portal 204 is a hop mesh point for the second data packet, and the mesh point 208-2 is a destination for a third data packet. For example, the mesh point 206-1 can determine that the destination of the first data packet is station 210-1, the destination of the second data packet is the distribution system 202, and the destination of the third data packet is mesh point 208-2. In this example, the mesh point 206-1 can determine that the mesh point 208-1 is a hop mesh point for the first data packet, the mesh portal 204 is a hop mesh point for the second data packet, and the mesh point 208-2 is a destination of the third data packet based on the destination of the first data packet, the second data packet, and the third data packet.

In some examples, the mesh point 206-1 can establish a group 216 that includes the mesh portal 204 and a group 218 that includes the mesh point 208-1 and the mesh point 208-2. In some examples, the group 216 and the group 218 can be considered a single group by the mesh point 206-1. In some examples, the group 216 can be an uplink group for the mesh point 206-1 where mesh portal 204 is in an uplink path from mesh point 206-1. In some examples, the group 218 can be a downlink group for the mesh point 206-1 where mesh point 208-1 and mesh point 208-2 are in a downlink path from the mesh point 206-1.

In some examples, the groups 216, 218 can be a MU-MIMO group. For example, the groups 216, 218 can be a MU-MIMO group that allows the mesh point 206-1 to simultaneously transmit the first data packet to mesh point 208-1, the second data packet to the mesh portal 204, and the third data packet to the mesh point 208-2. That is, the mesh point 206-1 can simultaneously transmit data packets in an uplink path and a downlink path. In some examples, the first data packet can include different information than the second data packet and/or third data packet. For example, the first data packet can be unrelated to the second data packet and/or third data packet. That is, simultaneously transmitting the first data packet, the second data packet, and third data packet is different than transmitting a broadcast packet.

In some examples, mesh point 206-1 or other mesh points of the network 200 can utilize the MU-MIMO group to transmit the first data packet, the second data packet, and the third data packet simultaneously to lower a quantity of time for transmitting the first data packet, the second data packet, and the third data packet. For example, it can take less time to transmit the first data packet, the second data packet, and the third data packet simultaneously to the mesh points of the MU-MIMO group than transmitting the first data packet, the second data packet, and the third data packet separately.

Figure 3:
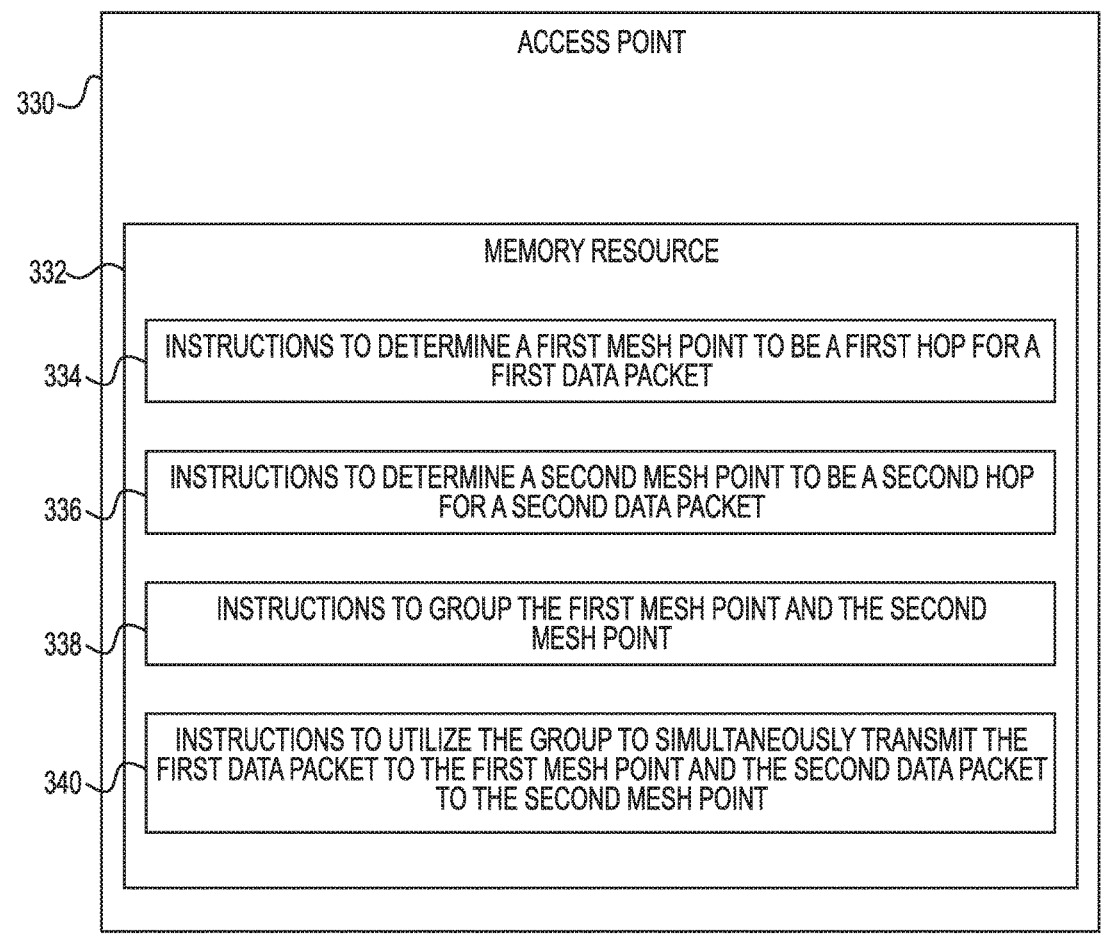
FIG. 3 is a block diagram of an example access point for access point group transmissions, consistent with the present disclosure.

FIG. 3 is a block diagram of an example access point 330 for access point group transmissions, consistent with the present disclosure. In some examples, the access point 330 can be a mesh point or mesh portal as referenced in FIG. 1, and/or FIG. 2. In some examples, the access point 330 can include a memory resource 332 that can be utilized to store instructions 334, 336, 338, 340 that can be executed by a processing resource to perform functions described herein.

A processing resource may be a central processing unit (CPU), microprocessor, and/or other hardware device suitable for retrieval and execution of instructions stored in memory resource 332. In the particular example shown in FIG. 3, processing resource may receive, determine, and send instructions 334, 336, 338, 340. As an alternative or in addition to retrieving and executing instructions 334, 336, 338, 340, processing resource may include an electronic circuit comprising a number of electronic components for performing the operations of the instructions 334, 336, 338, 340 in the memory resource 332. With respect to the executable instruction representations or boxes described and shown herein, it should be understood that part or all of the executable instructions 334, 336, 338, 340 and/or electronic circuits included within one box may be included in a different box shown in the figures or in a different box not shown.

Memory resource 332 may be any electronic, magnetic, optical, or other physical storage device that stores executable instructions 334, 336, 338, 340. Thus, memory resource 332 may be, for example, Random Access Memory (RAM), an Electrically-Erasable Programmable Read-Only Memory (EEPROM), a storage drive, an optical disc, and the like. The executable instructions 334, 336, 338, 340 may be stored on the memory resource 332. Memory resource 332 may be a portable, external or remote storage medium, for example, that allows the system to download the instructions 334, 336, 338, 340 from the portable/external/remote storage medium. In this situation, the executable instructions 334, 336, 338, 340 may be part of an "installation package". As described herein, memory resource 332 may be encoded with executable instructions 334, 336, 338, 340 for access point group transmissions.

The access point 330 may include instructions 334 executable by a processing resource, to determine a first mesh point to be a first hop for a first data packet. As described herein, an access point can utilize a destination address of the first data packet to determine a number of hop mesh points or hop access points for the first data packet. In some examples, the first hop can be a mesh point or access point that is in an uplink path from the access point or a mesh point or access point that is in a downlink path from the access point.

As described herein, a hop mesh point or hop access point can be a mesh point that is connected directly to the destination device (e.g., station, client device, device with destination address, etc.) or connected to a mesh point that is connected to a sending device and connected indirectly to the destination device (e.g., connected to an additional mesh point that is connected to the destination device, etc.). For example, a hop mesh point can be a mesh point in a path between the access point 330 and a destination device (e.g., station, client device, mesh point, access point, mesh portal, etc.).

The access point 330 may include instructions 336 executable by a processing resource, to determine a second mesh point to be a second hop for a second data packet. In some examples, the second data packet is a different data packet than the first data packet. For example, the second data packet can include different information and a different destination address than the first data packet. In some examples, the first hop for the first data packet can be a different hop mesh point or mesh access point than the second hop for the second data packet.

In some examples, first mesh point and the second mesh point are communicatively coupled to the access point 330 by a wireless backhaul. In some examples, the first mesh point and the second mesh point can be wirelessly connected to send and/or receive data packets. For example, the access point 330 can be utilized to send data packets from a distribution system to a plurality of client devices and/or send data packets from a plurality of client devices to the distribution system.

The access point 330 may include instructions 338 executable by a processing resource, to group the first mesh point and the second mesh point. As described herein, the access point 330 can group the first mesh point and the second mesh point into a multi-user multiple-input multiple-output (MU-MIMO) group. In some examples, the access point 330 can generate the MU-MIMO group and treat the first mesh point and the second mesh point as client devices, even though the first mesh point and the second mesh point may not be client devices.

In some examples, the first mesh point is in a downlink path of the access point and the second mesh point is in an uplink path of the access point. As described herein, the MU-MIMO group can be utilized to simultaneously transmit separate data packets to mesh points of the MU-MIMO group. In some examples, the access point 330 can treat the first mesh point and the second mesh point as client devices to simultaneously transmit the first data packet and the second data packet. For example, access points such as the access point 330 can utilize MU-MIMO groups to simultaneously transmit data packets for client devices of the MU_MIMO group. Thus, in some examples, the access point 330 can treat the first mesh point and the second mesh point as client devices.

The access point 330 may include instructions 340 executable by a processing resource, to utilize the group to simultaneously transmit the first data packet to the first mesh point and the second data packet to the second mesh point. As described herein, the access point 330 temporarily treats the group as client devices in a MU-MIMO group. As described herein, in some examples, at least one of the first mesh point and the second mesh point can be a mesh portal connected to a distribution system.

Figure 4:
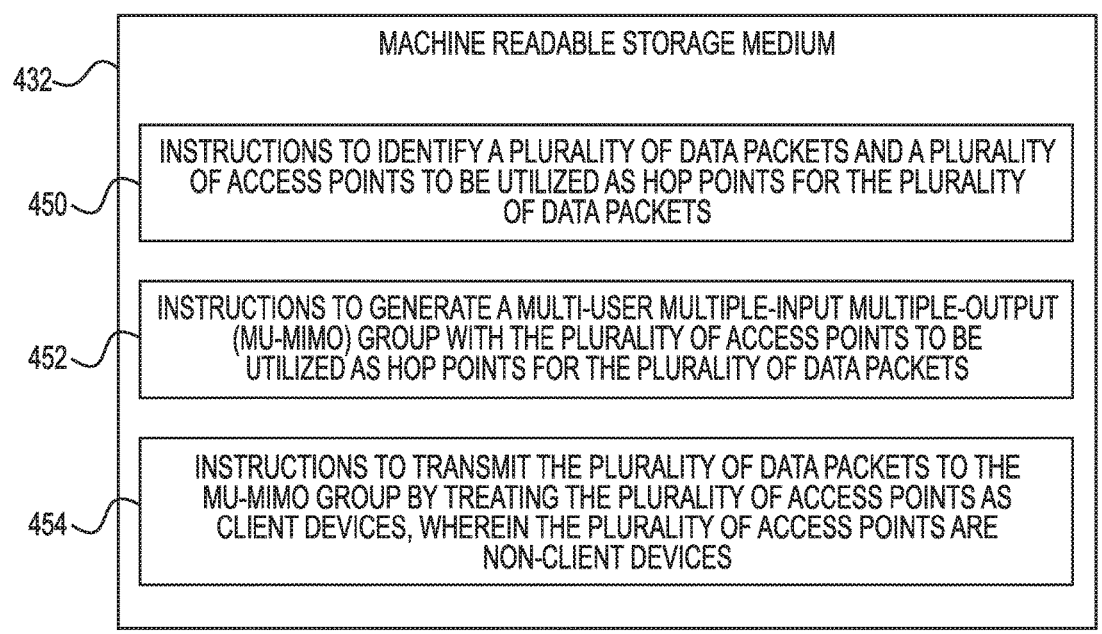
FIG. 4 is a block diagram of an example machine readable storage medium for access point group transmissions, consistent with the present disclosure.

FIG. 4 is a block diagram of an example machine readable storage medium 432 for access point group transmissions, consistent with the present disclosure. In some examples, the machine readable storage medium 432 can be the same or similar to memory resource 332 as referenced in FIG. 3. For example, machine readable storage medium 432 can be utilized to store instructions 450, 452, 454 by a network device such as an access point. As described herein, the instructions 450, 452, 454 can be executed by a processor to perform a number of functions described herein.

In some examples, the machine readable storage medium 432 can include instructions 450 executable by a processing resource, to identify a plurality of data packets and a plurality of access points to be utilized as hop points for the plurality of data packets. As described herein, identifying a plurality access points to be utilized as hop points (e.g., hop mesh points, hop access points, etc.) can include determining a destination of the plurality of data packets. In some examples, the destination of the plurality of data packets can be determined based on a destination address of the plurality of data packets. For example, the destination address of the plurality of data packets can indicate one or more hop points for delivering the data packet to the destination device with the destination address.

In some examples, the machine readable storage medium 432 can include instructions 452 executable by a processing resource, to generate a multi-user multiple-input multiple-output (MU-MIMO) group with the plurality of access points to be utilized as hop points for the plurality of data packets. As described herein, the hop points can be grouped together as a MU-MIMO group. In some examples, the group of hop points can be treated as client devices when the hop points are non-client devices. For example, the hop points can be mesh points or access points within a network compared to client devices or stations connected to the network.

In some examples, the plurality of data packets are transmitted simultaneously to the MU-MIMO group. In some examples, a portion of the plurality of data packets are transmitted to a corresponding portion of the plurality of access points in an uplink path (e.g., pathway) and a portion of the plurality of access points is in a downlink path. As described herein, each of the plurality of data packets can include a different type of data corresponding to a specific destination.

As described herein, the machine readable storage medium 432 can include instructions 454 executable by a processing resource, to transmit the plurality of data packets to the MU-MIMO group by treating the plurality of access points as client devices even when the plurality of access points are non-client devices. In addition, each of the plurality of data packets are transmitted to a corresponding access point of the plurality of access points based on a destination of each of the plurality of data packets.

Figure 5:
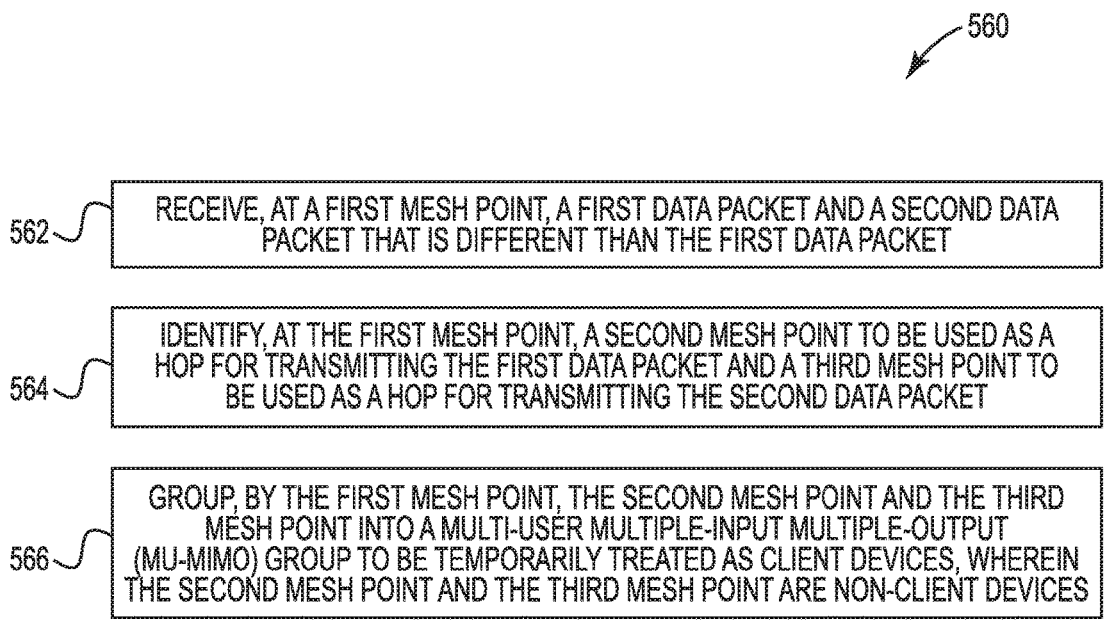
FIG. 5 is a block diagram of an example method for access point group transmissions, consistent with the present disclosure.

FIG. 5 is a block diagram of an example method 560 for access point group transmissions, consistent with the present disclosure. In some examples, the method 560 can be performed by a network device such as an access point or mesh point. For example, the method 560 can be executable instructions that can cause a processor to perform a number of functions described herein.

At box 562, the method 560 can include receiving, at a first mesh point, a first data packet and a second data packet that is different than the first data packet. As described herein, a plurality of data packets can be received at the first mesh point. In some examples, the first mesh point can receive a plurality of different data packets with corresponding destination addresses. That is, the first mesh point can have a plurality of data packets to transmit to a plurality of network devices (e.g., other mesh points, client devices, mesh portals, etc.).

At box 564, the method 560 can include identifying, at the first mesh point, a second mesh point to be used as a hop for transmitting the first data packet and a third mesh point to be used as a hop for transmitting the second data packet. As described herein, the first mesh point can identify a second mesh point to be utilized as a hop (e.g., hop mesh point, hop access point, etc.). In some examples, the second mesh point can be identified utilizing the destination address of a data packet from the plurality of data packets. In some examples, the destination address can be utilized to identify a mesh point that is on an uplink path or downlink path between the first mesh point and a destination device.

At box 566, the method 560 can include grouping, by the first mesh point, the second mesh point and the third mesh point into a multi-user multiple-input multiple-output (MU-MIMO) group to be temporarily treated as client devices, wherein the second mesh point and the third mesh point are non-client devices. As described herein, the MU-MIMO group can be utilized to simultaneously transmit data packets to the second mesh point and the third mesh point by treating the second mesh point and the third mesh point as client devices.

In some examples, the method 560 can include transmitting, by the first mesh point, the first data packet to the second mesh point and simultaneously transmitting, by the first mesh point, the second data packet to the third mesh point. In some examples, transmitting the first data packet is performed in a downlink path and transmitting the second data packet is performed in an uplink path.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, the designator "N", particularly with respect to reference numerals in the drawings, can indicate that a number of the particular feature so designated can be included with examples of the present disclosure. The designators can represent the same or different numbers of the particular features. Further, as used herein, "a number of" an element and/or feature can refer to one or more of such elements and/or features.

What is claimed:

1. An access point, comprising:
   a processing resource; and
   a memory resource storing machine readable instructions to cause the processing resource to:
   determine a first mesh point to be a first hop for a first data packet;
   determine a second mesh point to be a second hop for a second data packet;
   group the first mesh point and the second mesh point; and
   utilize the group to simultaneously transmit the first data packet to the first mesh point and the second data packet to the second mesh point, wherein the access point temporarily treats the group as client devices in a multi-user multiple-input multiple-output (MU-MIMO) group.

2. The access point of claim 1, wherein the first mesh point is in a downlink path of the access point and the second mesh point is in an uplink path of the access point.

3. The access point of claim 1, wherein the first mesh point and the second mesh point are communicatively coupled to the access point by a wireless backhaul.

4. The access point of claim 1, wherein the first data packet is different than the second data packet.

5. The access point of claim 1, wherein the first mesh point and the second mesh point are non-client devices.

6. The access point of claim 1, wherein at least one of the first mesh point and the second mesh point are a mesh portal connected to a distribution system.

7. A non-transitory machine readable storage medium having stored thereon machine readable instructions to cause a computer processor of a network device to:
   receive a first data packet and a second data packet that is different than the first data packet;
   identify a first access point to be used as a hop for transmitting the first data packet and a second access point to be used as a hop for transmitting the second data packet respectively;
   generate a multi-user multiple-input multiple-output (MU-MIMO) group including both the first access point and the second access point, wherein the first access point and the second access point are temporarily treated as client devices;
   transmit the first data packet and the second data packet to the MU-MIMO group by treating the first and second access points as client devices, wherein the first and second access points are non-client devices.

8. The machine readable storage medium of claim 7, wherein each of the plurality of data packets are transmitted to a corresponding access point of the plurality of access points based on a destination of each of the plurality of data packets.

9. The machine readable storage medium of claim 7, wherein the plurality of data packets are transmitted simultaneously to the MU-MIMO group.

10. The machine readable storage medium of claim 7, wherein a portion of the plurality of data packets are transmitted to a corresponding portion of the plurality of access points in an uplink path.

11. The machine readable storage medium of claim 7, wherein each of the plurality of data packets include a different type of data corresponding to a specific destination.

12. A method comprising:
    receiving, at a first mesh point; a first data packet and a second data packet that is different than the first data packet;
    identifying, at the first mesh point, a second mesh point to be used as a hop for transmitting the first data packet and a third mesh point to be used as a hop for transmitting the second data packet; and
    grouping, by the first mesh point, the second mesh point and the third mesh point into a multi-user multiple-input multiple-output (MU-MIMO) group to be temporarily treated as client devices, wherein the second mesh point and the third mesh point are non-client devices.

13. The method of claim 12, comprising transmitting, by the first mesh point, the first data packet to the second mesh point and simultaneously transmitting, by the first mesh point, the second data packet to the third mesh point.

14. The method of claim 13, wherein transmitting the first data packet is performed in a downlink path and transmitting the second data packet is performed in an uplink path.

* * * * *